2 Sheets—Sheet 1.

J. D. WILLOUGHBY.
STEAM AND VACUUM-PUMP.

No. 182,005.　　　　　　　　　　Patented Sept. 5, 1876.

Witnesses:
Lewis F. Brow
A. P. Grant

Inventor:
James D. Willoughby
by John A. Wiedersheim
Atty.

2 Sheets—Sheet 2.

J. D. WILLOUGHBY.
STEAM AND VACUUM-PUMP.

No. 182,005. Patented Sept. 5, 1876.

Witnesses:
Lewis F. Brous
A. P. Grant.

Inventor:
James D. Willoughby
by John A. Diedersheim
Atty.

UNITED STATES PATENT OFFICE.

JAMES D. WILLOUGHBY, OF PHILADELPHIA, PENNSYLVANIA.

IMPROVEMENT IN STEAM AND VACUUM PUMPS.

Specification forming part of Letters Patent No. 182,005, dated September 5, 1876; application filed February 8, 1876.

*To all whom it may concern:*

Be it known that I, JAMES D. WILLOUGHBY, of the city and county of Philadelphia, and State of Pennsylvania, have invented a new and useful Improvement in Steam-Pumps; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
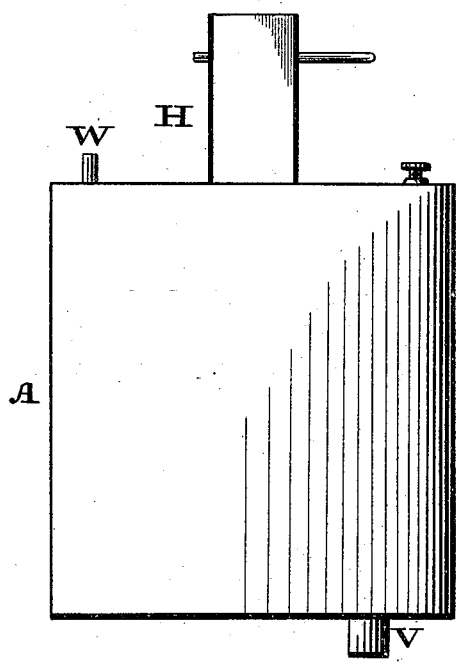
Figure 2:
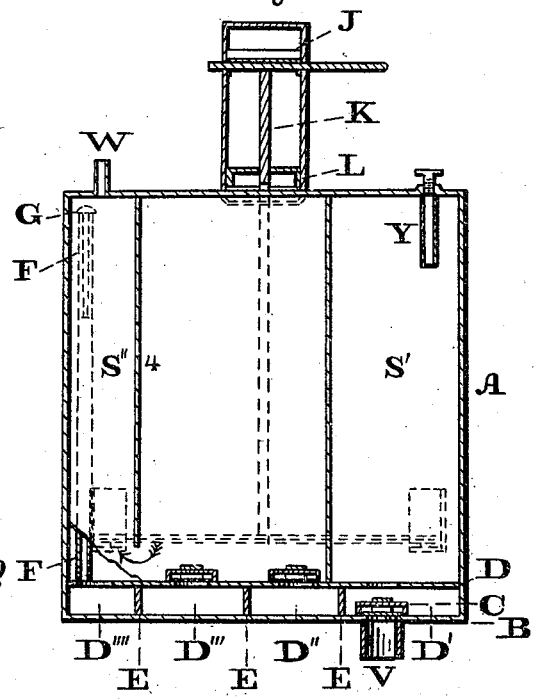
Figure 3:
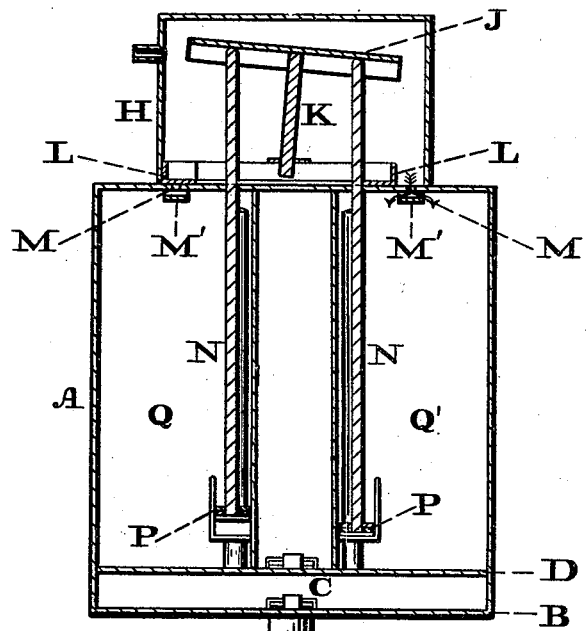
Figure 4:
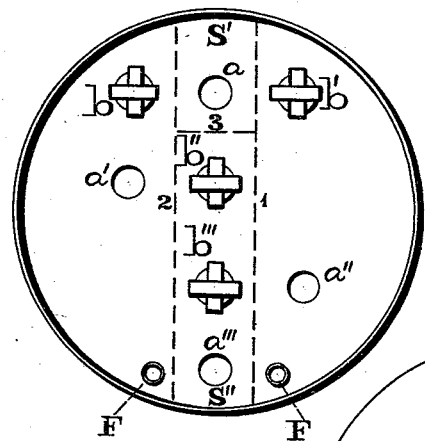
Figure 5:
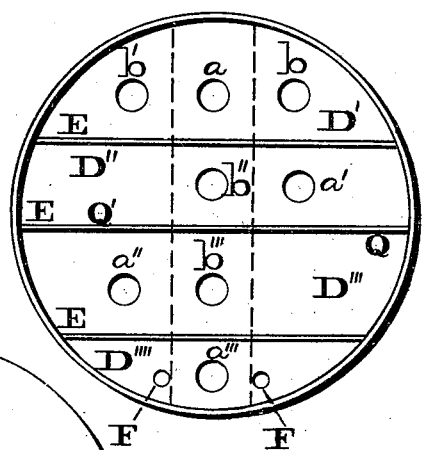
Figure 6:
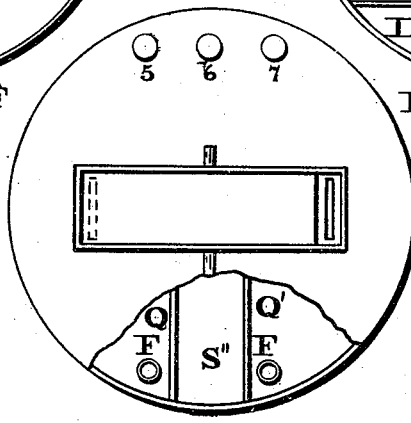

Figure 1 is a side elevation of the pump embodying my invention. Figs. 2 and 3 are transverse vertical sections in diametrically-opposite directions. Fig. 4 is a top view of one of the bottom plates; and Fig. 5 is a view of the under side thereof. Fig. 6 is a top view of Fig. 1, partly broken away.

Similar letters of reference indicate corresponding parts in the several figures.

My invention consists in giving the required motion to the steam-valve of a steam-pump by means of what I call a thermostat, which is located in the work-chamber of the pump, where the alternating high and low temperature will give to the thermostat the motion and force required to move the valve. The motion thus given to the valve is sufficiently slow to avoid the slamming of the water-valves, and the sudden strains upon the pump which a sudden opening and closing of the steam-ports would produce. It also consists of means for gradually producing a vacuum in the work-chamber, which is done by injecting a stream of water into the chamber after the steam is cut off. The first of the stream is hot, or at least warm, but each succeeding particle of water is less and still less hot, until its coldness produces the desired vacuum, and thereby avoids the sudden jars and strains upon the pump that a sudden vacuum would produce. It also consists in the construction and combination of various parts, which co-operate to form an improvement in steam-pumps.

Referring to the drawings, A represents the body of the pump, which in form is cylindrical. The inside is divided or formed into four compartments or chambers by vertical partitions 1 2 3, which extend from end to end, or top to bottom, of the cylinder. (See Fig. 4, dotted lines.) Q Q' are work-chambers, into which water and steam alternately enter. S' is a receiving or reservoir chamber, into which the water enters when drawn upward through the suction-pipe V. S'' is a discharge-chamber, and it has in it a supply of air, to give regularity to the stream of water which is being discharged. To prevent the escape of air at the discharge-pipe W a partition, 4, extends from the top of the chamber downward nearly to its lower end or bottom. This partition also strengthens the thin partitions to which it is joined; but, when preferred, it may be dispensed with by extending the lower end of the discharge-pipe nearly to the bottom of the chamber. Both ends of the cylinder are closed by a top and bottom piece that fits tightly against the cylindrical shell and the partitions, which are flush with each end of the cylinder.

B is the lower plate of the bottom piece, with a foot-valve, C, shown on its upper side. In practice the foot-valve should be near the lower end of the suction-pipe. Above the plate B is another plate, D. These plates are so formed and united together at their outer edge as to leave a hollow space between them. The upper side of plate D forms the bottom of the chambers which have been described. In this plate is formed a series of openings, $a$ $a'$ $a''$ $a'''$, and a series of valves, $b$ $b'$ $b''$ $b'''$, rest on its upper side and cover other openings. On the under side of this plate, and connected with it and with plate B, are three transversely-extending strips or divisions, E, which convert the space between B and D into a series of water-passages, $D'$ $D''$ $D'''$ $D''''$, which communicate with the openings and valves before referred to.

It will be seen that the opening $a$ and valves $b$ $b'$ communicate with each other through the water-passage $D'$. This passage is also in direct communication with the suction-pipe V. The opening $a'$ communicates with the valve $b''$ through the water-passage $D''$, and the opening $a''$ communicates with the valve $b'''$ through the water-passage $D'''$. The water-passage $D''''$, with its openings $a'''$, communicates with the lower end of each injection-pipe F. This passage could be dispensed with if the lower ends of each injection-pipe were made to enter directly into the discharge-chamber; but the construction shown is preferred.

From the plate D rise two injection-pipes, F, one in each work-chamber, Q Q'. The lower ends of these pipes communicate with water in passage D''''. The upper ends are provided with valves G, which close when steam is in the work-chamber, and open when the steam is cut off.

On the upper side of the lid or top of the cylinder is a steam-chest, H, within which is journaled a rock-shaft, J, which is connected with the steam-valve L by means of an arm, K, so that when rocking motion is given to the shaft reciprocating motion will be given to the valve, and cause it to open and close the steam-ports M, as desired.

Rocking motion is communicated to the rock-shaft by means of shaft-rods or other connections N, which, as shown, pass from the rock-shaft downward through the lid of the pump, their lower end being attached to, or made to rest on, the middle of the thermostat P. The ends of the thermostat rest on, or are attached to, seats near the lower end of the work-chamber.

The thermostats I have shown are composed of iron and brass riveted together; but they may be made of any two metals that will expand differently under the same degree of heat, or they may be made of any material, and in any form, so that the changing temperature of the work-chamber will cause them to move a sufficient distance and with sufficient force to operate the steam-valves.

Either alcohol, mercury, or other liquids can be used, as well as air and various gases. The liquids and fluids can be securely confined in a vessel having a diaphragm or corrugated top, which will move outward under expansion and regain its former position under contraction.

Any known device or material that the varying heat of the work-chamber would operate or move, as desired, can be used, and is regarded as a thermostat.

The thermostats are so connected with the valve L, by means of the rods N and rock-shaft J, or other suitable devices, that the motion of the thermostat when heated is communicated to the valve, and thus made to open and close the steam-ports, as desired.

Water is admitted into the lower end of the pump through the suction-pipe Y, and discharged at the upper end through the pipe W. Under the steam-ports M are deflecting plates M', which prevent the steam from passing downward directly into the water, where it would be rapidly condensed.

In order to prime the pump or fill it with water preparatory to putting it into action, three primary ports or orifices, 5, 6, 7, are made in the top lid, one opening into each work-chamber, and one opening into the receiving or reservoir chamber. A pipe, Y, extends downward a short distance from the last-named port, the object being to prevent the escape of all the air from the chamber when it is primed, but all the air should be out of the work-chambers, and when the priming is completed the ports should be closed by inserting the plugs or caps used for that purpose.

The operation is as follows: When the pump is primed it is ready for the admission of steam into the steam-chest; and when the steam-valve is in the position shown in the drawing the steam will pass down through the port M into the work-chamber Q', and in its downward direction will strike the deflecting plate M', and be changed in its course, and thus avoid the condensation which would have occurred if the steam had been permitted to force itself down into the water. As the steam presses upon the surface of the water in the chamber it will force the water from the lower end thereof down through the opening $a'$ and through the water-passage D'', and up through the valve $b''$ into the discharge-chamber S'', and out at pipe W.

When the water is so far forced out of the chamber that the steam will come in contact with the thermostat, the steam-valve will be moved by thermostatic action, so as to close the open port and open the closed one; or, to specify more fully, as the ends of the thermostat rest on permanent seats, they cannot move downward when heated; consequently the ports between the ends will rise upward, and thus raise the rod N, which moves the rock-shaft and the valve through or by its connection with the rock-shaft.

As shown, the brass side of the thermostat is on the upper side, and as brass expands more than iron or steel under a given heat, therefore the motion is upward, as specified.

The motion given to the steam-valve by a thermostat is sufficiently slow to avoid the slamming of the water-valves, and the sudden jars and strains produced in steam-pumps by the sudden opening and closing of the steam-ports.

If the metals of which the thermostats are made are thick, their action will be slower than if formed of thin material; or if one end is higher in position than the other, so that steam will not at the same moment come in contact with the entire length, the action will be slower.

Very soon after the steam is cut off from the work-chamber by the action of the thermostats, the pressure therein will be less than the weight of water in the discharge-chamber, which will permit the water to be injected into the work-chamber through the injection-pipe F. This pipe being long, and having just been surrounded by steam, the water in it will be hot, or at least quite warm, so that the first water injected into the chamber is warm; but each succeeding particle is colder, and this gradually produces the desired vacuum, and thereby avoids the slamming of water-valves, and the sudden jars and strains produced in pumps by sudden condensation.

Very soon after steam is cut off from the work-chamber the valve $b''$ will close, and keep the water from the discharge-chamber from returning to the work-chamber. The vacuum now formed in the last-named chamber will cause the water from the reservoir to raise the valve $b$ and fill the vacuum.

The reservoir will supply the demand made upon it until the partial vacuum formed therein, or the space only filled with expanded air, has a lifting-force equal to the weight of the water in the suction-pipe; then water will rise in the suction-pipe, and flow through the reservoir into the vacuum in the work-chamber until it is full. The water in the suction-pipe now being in motion will continue to rise to fill the vacuum in the reservoir, but before it is entirely full the other work-chamber will draw upon it for water, and thus continuously keep the water moving upward in the suction-pipe, and thereby avoid the sudden jars and strains upon the pump that would be caused by suddenly stopping and starting the water in said pipe.

The position given to the thermostats by steam or heat is changed when covered with water, so that neither of them will offer resistance to the action of the other.

The operation is substantially the same in each work-chamber, though it will be seen that each chamber has its own valves, opening, water-passages, and injection-pipe.

Having thus described my invention, what I claim as new, and desire to secure by Letters Patent, is—

1. In a steam-pump, a thermostat, in combination with the steam-valve, substantially as and for the purpose set forth.

2. The rock-shaft J and steam-valve L, in combination with the rods N, which are in contact or connected at one end with the rock-shaft, passed into the work-chambers, and automatically operated at the other end in said chambers, by means substantially as described, and for the purpose set forth.

3. The water-passages $D'$ $D''$ $D'''$ $D''''$, in combination with the openings $a$ $a'$ $a''$, and valves $b'$ $b''$ $b'''$, and suction-pipe V, substantially as described, and for the purpose set forth.

4. The injecting-pipes F, communicating with the work-chambers and the discharge-chamber, and combined therewith, substantially as and for the purpose set forth.

5. The combination of the work-chambers Q Q', and receiving or reservoir chamber S', and discharge-chamber S'', within the cylindrical shell A, substantially as described, and for the purpose set forth.

JAMES D. WILLOUGHBY.

Witnesses:
JOHN A. WIEDERSHEIM,
H. E. HINDMARSH.